July 27, 1943.                J. D. KNISELY                 2,325,251
                      STORAGE BATTERY CHARGE INDICATOR
                        Filed March 25, 1940          2 Sheets-Sheet 1
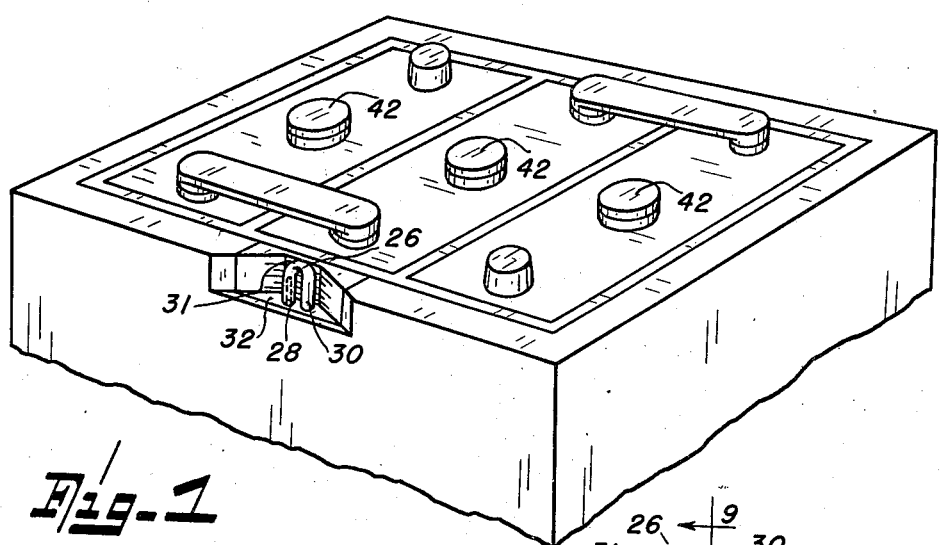
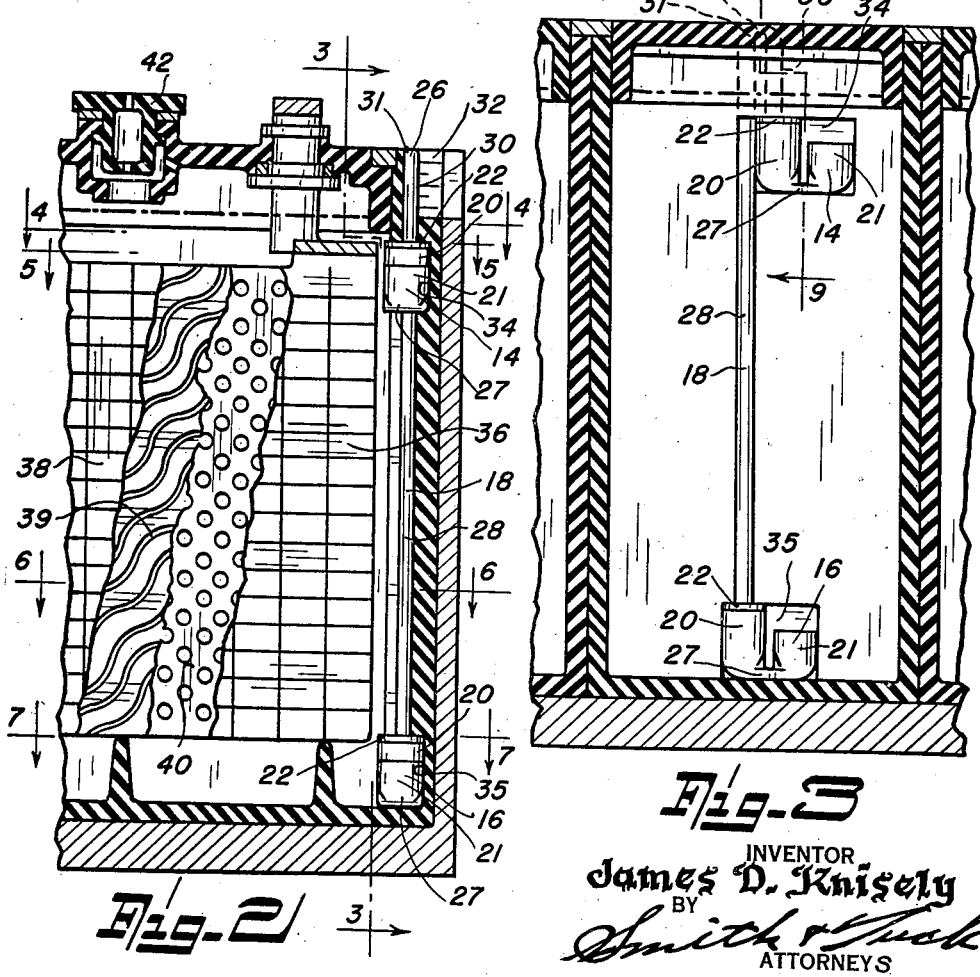
INVENTOR
James D. Knisely
BY
Smith & Tuck
ATTORNEYS

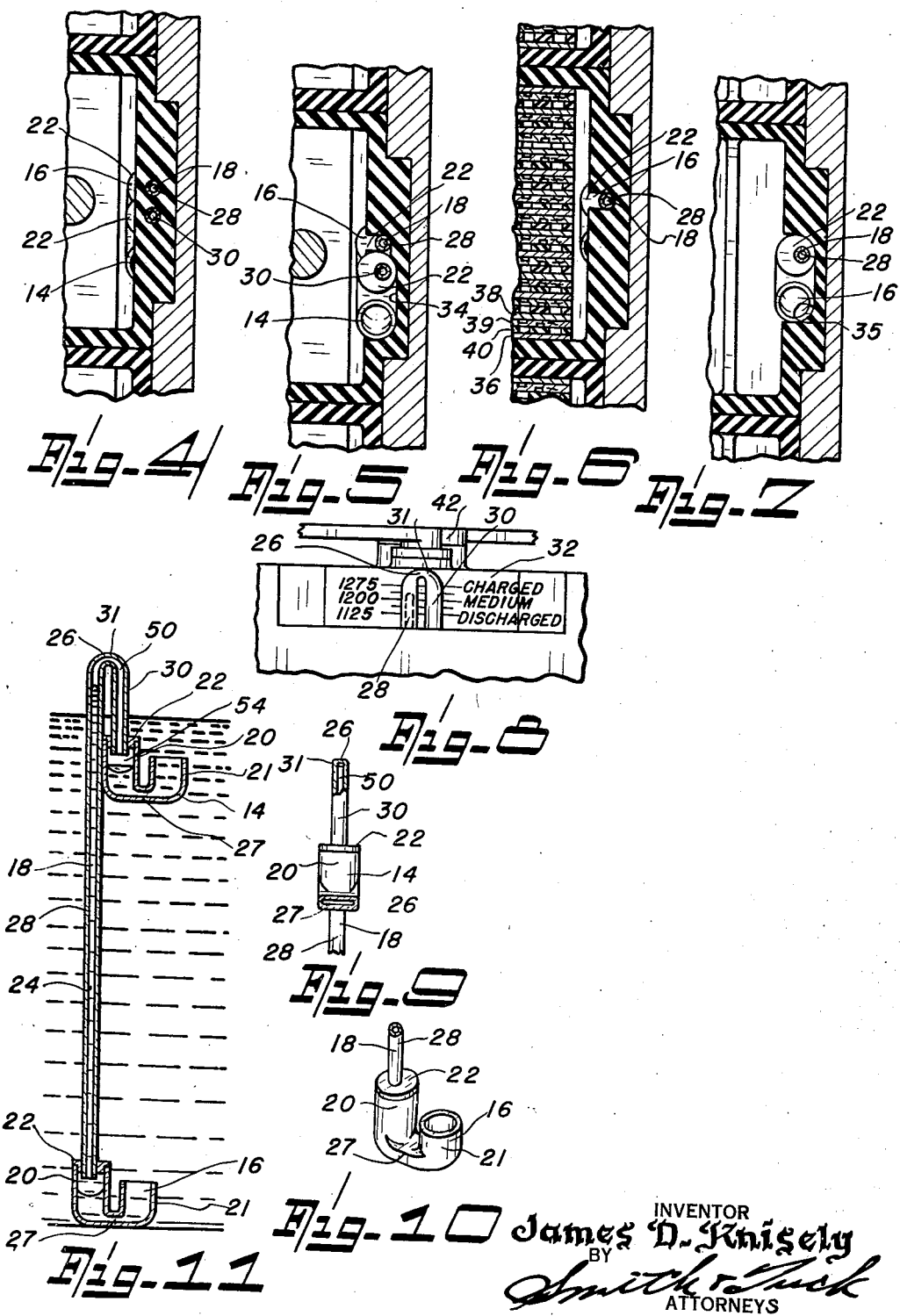

Patented July 27, 1943

2,325,251

UNITED STATES PATENT OFFICE 2,325,251

STORAGE BATTERY CHARGE INDICATOR

James D. Knisely, Seattle, Wash.

Application March 25, 1940, Serial No. 325,808

9 Claims. (Cl. 265—44)

My present invention relates to a storage battery charge indicator.

My invention consists essentially of immersing two U tubes in the electrolyte of a battery, one near the bottom of the battery cell, and one near the top, the upper U tube being disposed just sufficiently below the surface that normal evaporation of the electrolyte will not uncover it. The U tubes are then connected by a capillary tube of reduced cross-section. The capillary tube in turn is partially filled with, preferably, a colored oil or other suitable fluid that will serve as an indicator and which will be actuated by changes in the specific gravity of the electrolyte to indicate the electrical charge of the battery.

My indicator operates on an easily demonstrated principle that at any depth, beneath the liquid in a battery cell, the hydrostatic pressure is equal to the product of the depth and the gravity of the liquid. Similarly, between two points of different depth, the differential of hydrostatic pressure is directly proportional to the specific gravity. Therefore, my device operates on the plan that a differential pressure gauge may be used to indicate the charge in a storage battery cell. Air expansion, restricted dimensions, small pressure fluctuations, sticking menisci, and danger of losing calibration are factors which prohibit the use of a conventional design of differential gauge for this purpose. My device, as illustrated in the accompanying drawings, is specifically created to overcome these objections.

The principal object of my present invention is to provide a storage battery charge indicator which is characterized by extreme simplicity in construction, a factor that contributes both to its certainty of operation and enables one to produce it so economically that it can be generally used in storage batteries, and can be incorporated as a part thereof.

An important object of my present invention is to provide a convenient, visible, charge indicator that will be, at all times, in the battery cell so that the user of the same, by mere inspection of the battery, may determine the condition of cells each having such a device without uncovering the cell or subjecting himself to any possible danger from the battery acids and the like.

A further object of my invention is to so proportion the U tubes and the capillary tube connecting the same that the entire device can be lifted out of a battery without destroying its calibration, and also without creating the possibility of air entering the tubes, which would in turn affect its calibration.

A further object of my invention is to provide a charge indicator which will give accurate readings independent of the fluctuations of the liquid level in the battery cells.

Another object of my invention is to provide a small capillary tube to the end that the meniscus between the oil and the electrolyte in the lower U tube or the trapped air above the water in the upper U tube will be so many times larger in cross-sectional area than the area of the capillary tube that the motion of the meniscus will be so minute that, should the meniscus in either tube tend to stick to the U tubes it could not restrict the motion of the indicating oil in the capillary tube.

A further object of my invention is to so proportion the U tubes and the capillary tube that there will be little rise and fall in the U tubes at the juncture or meniscus between the air and the fluid of the capillary tube; the movement there will be at a minimum, and the maximum movement of the indicating fluid column will be obtained, thus providing for easy determination of the condition of the battery.

Other and more specific objects will be apparent from the following description taken in connection with the accompanying drawings wherein Figure 1 is a perspective view showing the top of a storage battery with my indicating device installed thereon.

Figure 2 is a typical, vertical, sectional view taken longitudinally through a cell of a storage battery.

Figure 3 is a vertical, sectional view taken along the line 3—3 of Figure 2.

Figures 4, 5, 6, and 7 are cross-sectional views in plan, taken along similarly numbered lines of Figure 2.

Figure 8 is an enlarged fragmentary view showing the indicating portion of my device so that its structure may be more readily observed.

Figure 9 is a vertical, sectional view taken along the line 9—9 of Figure 3, with the battery removed so as to better illustrate the construction of the U tube and capillary tubes.

Figure 10 is a perspective view showing one of the U tubes used with my device. The drawing might be taken to be either the upper or lower tube.

Figure 11 is a vertical, cross-sectional view through the essential parts of my battery charge indicating device.

Referring to the drawings, throughout which like reference characters indicate like parts, 14 designates the upper U tube of my device, 16 the lower U tube, and 18 the connecting capillary tube. The upper and lower U tubes are formed of any suitable material and are provided with the long leg 20 and the short leg 21. In the long leg of each U tube is seated a stopper 22 which serves to seal that end of the U tube and also to seal the point of entry of the capillary tube, the construction being similar for both upper and lower U tubes. Normally, the capillary tube 26 is made of glass having a relatively small bore. Then the U tubes must be so arranged that when the device is lifted out of a battery, for instance, there will be sufficient capacity in the lower U tubes to accommodate the oil column 24 so that it will not run down and overflow out of the lower U tube. Similarly it is desirable that as the oil descends in the capillary tube the upper tube will be of sufficient capacity so that water will not be sucked into the short leg of the capillary tube as by so doing a syphon action might be created that would introduce air into the capillary tube in excess of the entrapped air, and thus upset the calibration of the unit.

The U tubes have a reduced intermediate passage at the center of the U particularly after the showing at 27 of Figure 9 so that in the upper U tube the bend will be restricted to minimize the likelihood of air entering the tube if the indicator is tipped while it is out of water. Similarly in the lower U tube, pinching of the tube so restricts the passage way at 27 that it minimizes the possibility of oil escaping if the indicator is tipped.

The glass capillary tube 26 is provided with downwardly extending portions such as the long leg 28 and a short leg 30 with a sharp return bend connecting the two legs as shown at 31. A short bend is desirable, even with some restriction at this point, in order that the two legs will lie reasonably close together so that a minimum amount of space will be required for the installation as illustrated in Figures 1 and 3, particularly. It will be noted that the proportioning of the device is such that normally the upper end of the oil column will lie between the markings shown in Figure 8, and for convenience this may be graduated in specific gravities, or for the use of the average owner, probably preferably marked as indicated "charged", "medium", "discharged".

A preferred installation of my device is shown in Figures 1, 2, and 3, in which the battery case is recessed at 32 to provide a shielded space for the indicator where it will be visible for easy inspection with the remainder of my device housed within the battery cell, which in turn is housed within the battery case. To best achieve this I provide recesses at 34 and 35 so that my device may set well into the wall of the cell, and thus not interfere with the normal plate arrangement of the battery cell. The plates consist, as is usual, of the negative plates 36 and the positive plates 38, the wood separators 39, and the perforated rubber spacers 40.

The lower U tube of my device should, preferably, be placed on the bottom of the battery cell so that there is the maximum obtainable distance between the two U tubes. The upper U tube is preferably placed about on the level with the top of the battery plates. This will normally be considerably below the working level of the electrolyte, and should take care of any changes of level due to evaporation and the like. it is understood that the exact position of the upper U tube is not critical excepting in so far as it is desirable to space the two U tubes as far apart as the battery will normally permit. As viewed in the various drawings, it will be noted that my indicator in no way interferes with the normal functions of the battery. The battery terminals are conventional, and the usual battery filling plug 42 is employed. However, in contrast with the conventional means, it is not necessary to remove plug 42 in order to determine the specific gravity of the electrolyte, as my indicator is constantly giving a true rendering of the condition of the charge contained in the electrolyte.

Attention is invited to the fact that while I have described my device as being particularly adapted to indicate the charge in a storage battery it will, by proper proportioning, be readily available as an indicator for changing specific gravities in many other liquids.

Ordinarily, expansion and contraction of the air trapped above the oil column in the capillary tube, which normally is at 50, and above the water meniscus in the upper U tube 14 would, due to temperature changes, be expected to cause error but this is negligible due to the fact that a proportionately greater variation in air volume will be compensated for in the open space at 54, within the upper U tube, with only a minute displacement of the water meniscus.

The foregoing description and the accompanying drawings are believed to clearly disclose a preferred embodiment of my invention, but it will be understood that this disclosure is merely illustrative and that such changes in the invention may be made as are fairly within the scope and spirit of the following claims.

Having thus fully described my invention what I claim as new and desire to secure by Letters Patent is:

1. A storage battery charge indicator, comprising an inverted U-shaped transparent capillary tube having its return bend above the level of the fluid electrolyte of the battery and having legs of unequal length terminating below the surface of the fluid electrolyte, a pair of upright U-tubes submerged in the electrolyte and having one leg of each communicably connected to a different leg of the capillary tube and the other leg of each filled with electrolyte, and a fluid column in the longer leg of the capillary tube influenced by changes in the specific gravity of the electrolyte of the battery.

2. A storage battery charge indicator, comprising an inverted U-shaped transparent capillary tube having its return bend above the level of the fluid electrolyte of the battery and having legs of unequal length terminating below the surface of the fluid electrolyte, a pair of upright U-tubes submerged in the electrolyte and having one leg of each communicably connected to a different leg of the capillary tube and the other leg of each filled with electrolyte and said legs being of unequal length and having an intermediate constricted throat therebetween, and a fluid column in the longer leg of the capillary tube influenced by changes in the specific gravity of the electrolyte of the battery.

3. A storage battery charge indicator, comprising an inverted U-shaped transparent capillary tube having its return bend above the level of the fluid electrolyte of the battery and having legs of unequal length terminating below the surface of the fluid electrolyte, a pair of upright U-tubes submerged in the electrolyte and having legs of unequal length, each longer leg communicably connected to a different leg of the capillary tube each shorter leg being filled with electrolyte, and a fluid column in the longer leg of the capillary tube influenced by changes in the specific gravity of the electrolyte of the battery.

4. A storage battery charge indicator, comprising an inverted U-shaped transparent capillary tube having its return bend above the level of the fluid electrolyte of the battery and having legs of unequal length terminating below the surface of the fluid electrolyte, a pair of upright U-tubes submerged in the electrolyte and having one leg of each communicably connected to a different leg of the capillary tube and the other leg filled filled with electrolyte, said legs having an intermediate throat, a fluid column in the longer leg of the capillary tube influenced by changes in the specific gravity of the electrolyte of the battery, and an air bubble trapped in the capillary tube between the fluid column and the electrolyte in the upright U-tube connected to the shorter leg of the capillary tube.

5. A storage battery charge indicator comprising an inverted U-shaped transparent capillary tube having its return bend above the level of the fluid electrolyte of the battery and having legs of unequal length, a pair of upright U-tubes submerged at different levels in the fluid electrolyte, seal means in a leg of each U-tube adapted to receive a leg of the capillary tube, and a fluid column in the longer leg of the capillary tube influenced by changes in the specific gravity of the electrolyte of the battery.

6. A storage battery charge indicator, comprising an inverted U-shaped transparent capillary tube having its return bend above the level of the fluid electrolyte of the battery and having legs of unequal length terminating below the surface of the fluid electrolyte, a fluid column in the longer of said legs, a pair of upright U-tubes submerged in the electrolyte and having one leg of each communicably connected to a different leg of the capillary tube and the other leg of each filled with electrolyte, and calibrated means associated with the capillary tube and the fluid column to incidate changes in the upper level of the fluid column.

7. A storage battery charge indicator, comprising an inverted U-shaped transparent capillary tube having its return bend above the level of the fluid electrolyte of the battery and having legs of unequal length terminating below the surface of the fluid electrolyte, an upright U-tube having one leg connected to the longer leg of the capillary tube, a second upright U-tube having one leg connected to the shorter leg of the capillary tube said upright U-tubes being submerged in the electrolyte at different levels, a fluid column in the longer leg of the capillary tube in contact with the electrolyte fluid in the first U-tube influenced by changes in the specific gravity of the electrolyte of the battery, and an air bubble trapped in the capillary tube between the fluid column and the electrolyte in the upright U-tube connected to the shorter leg of the capillary tube.

8. A storage battery charge indicator comprising an inverted U-shaped transparent capillary tube having its return bend above the fluid electrolyte in the battery and having legs of unequal length terminating below the surface of the fluid electrolyte, a pair of upright U-tubes submerged in the electrolyte each having one leg communicably connected to a different leg of the capillary tube, the other leg of each U-tube being open to the electrolyte, and a fluid column in the longer leg of the capillary tube insoluble in the electrolyte of the battery and influenced to rise and fall through the changes in the specific gravity thereof.

9. A storage battery charge indicator, comprising an inverted U-shaped transparent capillary tube having its return bend above the level of the fluid electrolyte of the battery and having legs of unequal length terminating below the surface of the fluid electrolyte, an upright U-tube having one leg connected to the shorter leg of the capillary tube and partially filled with electrolyte fluid and having an air pocket adjacent the end of the capillary tube, a second upright U-tube connected to the longer leg of the capillary tube and filled with electrolyte fluid, said upright U-tubes being submerged in the electrolyte at different levels, and a fluid column in the longer leg of the capillary tube in contact with the electrolyte fluid in the second U-tube and influenced by changes in the specific gravity of the electrolyte of the battery.

JAMES D. KNISELY.